United States Patent
Kurachi et al.

(10) Patent No.: US 12,137,693 B2
(45) Date of Patent: Nov. 12, 2024

(54) METHOD AND MACHINE FOR AGING A NOODLE STRIP

(71) Applicant: YUTAKA MFG. CO., LTD., Kounan (JP)

(72) Inventors: Masayasu Kurachi, Kounan (JP); Hideto Omi, Kounan (JP)

(73) Assignee: YUTAKA MFG. CO., LTD., Kounan (JP)

( * ) Notice: Subject to any disclaimer, the term of this patent is extended or adjusted under 35 U.S.C. 154(b) by 610 days.

(21) Appl. No.: 17/536,348

(22) Filed: Nov. 29, 2021

(65) Prior Publication Data

US 2022/0174964 A1     Jun. 9, 2022

(30) Foreign Application Priority Data

Dec. 4, 2020    (JP) .................................. 2020-201770

(51) Int. Cl.
*A21C 3/06*    (2006.01)
*A23L 7/109*    (2016.01)

(52) U.S. Cl.
CPC ................ *A21C 3/06* (2013.01); *A23L 7/109* (2016.08)

(58) Field of Classification Search
CPC .................................. A21C 3/06; A23L 7/109
See application file for complete search history.

(56) References Cited

U.S. PATENT DOCUMENTS

| | | | | |
|---|---|---|---|---|
| 4,267,199 A | * | 5/1981 | Koshida ................. | A23L 23/10 426/589 |
| 2003/0118684 A1 | * | 6/2003 | Finkowski ............. | A21C 9/063 425/208 |
| 2013/0337125 A1 | * | 12/2013 | Kobayashi .............. | B65B 19/34 426/414 |
| 2022/0174964 A1 | * | 6/2022 | Kurachi ................ | F26B 15/126 |

FOREIGN PATENT DOCUMENTS

JP            3353234 A        12/2002

* cited by examiner

*Primary Examiner* — Sean M Michalski
(74) *Attorney, Agent, or Firm* — LADAS & PARRY LLP; Malcolm J. MacDonald, Esq.

(57) ABSTRACT

When a sheet of plastic wrap is wound around noodle strips, a folded portion of the sheet of plastic wrap is held between layers of the noodle strip and is double wound on an outer side of the noodle strip. The sheet of plastic wrap covers an entirety of the wound noodle strip. The sheet of plastic wrap on an outer peripheral side of the folded sheet of plastic wrap extends from and is wound around a next noodle strip. Next, another folded portion of the sheet of plastic wrap is held between layers of the next noodle strip and is double wound on an outer side thereof. The sheet of plastic wrap sequentially covers an entirety of the next noodle strip.

18 Claims, 13 Drawing Sheets

METHOD AND MACHINE FOR AGING A NOODLE STRIP

CROSS-REFERENCE TO RELATED APPLICATIONS

This application claims priority to Japanese patent application serial number 2020-201770, filed on Dec. 4, 2020, the contents of which are incorporated herein by reference in their entirety for all purposes.

BACKGROUND

The present disclosure generally relates to a method and/or a machine for aging a noodle strip.

Noodle strips processed into Japanese wheat noodles, such as udon noodles, soba noodles, and ramen noodles, or gyoza and wonton wrappers, each of which material is elongated in a strip-shaped dough, are rested for a specific period of time. One method for aging such noodles is winding the noodle strip around a rod body with a flange (hereinafter referred to as a noodle rod) in a roll shape, covering the surface of the noodle strip with a sheet of plastic wrap, and resting it for the specific time of period.

For example, there may be a machine in which a noodle strip wound around a noodle rod in a roll shape is covered with a sheet of plastic wrap that has been cut to the necessary length, which is disclosed in, for example, Japanese Patent No. 3353234.

However, in the above-described machine, the sheet of plastic wrap covering the surface of the noodle strip may adhere to the surface of the noodle strip and/or to the wrap itself. As a result, after the aging of the noodle strip has been completed, it may be difficult to remove the sheet of plastic wrap from the surface of the noodle strip. This may cause a decrease in the productivity of noodle strip aging work.

Thus, in a case where the noodle strip wound around the noodle rod in a roll shape is covered with the sheet of plastic wrap to age the noodle strip, there is a need to easily remove the sheet of plastic wrap from the noodle strip after the aging has been completed.

SUMMARY

According to a first feature of the present disclosure, a method for aging a noodle strip comprises: a) winding a noodle strip, the noodle strip being elongated in a strip, shape around a noodle rod in a roll shape; b) winding a sheet of plastic wrap around the noodle strip such that an entirety of the outer peripheral of the noodle strip is covered by the sheet of plastic wrap; and c) preserving and aging a plurality of noodle strips that are arranged at a specified interval, each of the plurality of noodle strip being wound around the corresponding noodle rod in the roll shape and being sequentially covered by the sheet of plastic wrap. Furthermore, the winding of the sheet of plastic wrap is performed such that the sheet of plastic wrap is folded to be held between layers of the noodle strip toward an outer side thereof. The folded held portion of the sheet of plastic wrap is long enough to be double wound in a winding direction of the noodle strip. The sheet of plastic wrap is wound around the noodle strip such that the sheet of plastic wrap covers an entirety of the noodle strip wound around the noodle rod. The sheet of plastic wrap on an outer peripheral side of the folded sheet of plastic wrap extends to and is wound around a next noodle strip in the same manner as in a previous noodle strip. The sheet of plastic wrap sequentially covers an entirety of the next noodle strip.

Because of this configuration, a plurality of noodle strips wound in a roll shape, which are to be aged, are sequentially covered with a sheet of plastic wrap. Furthermore, the winding ends of the sheet of plastic wrap do not adhered to the noodle strips, but are instead separated from the noodle strips. Also, the sheet of plastic wrap sequentially covers the plurality of noodle strips. Because of this configuration, it is easier to remove the sheet of plastic wrap from the aged noodle strips, for instance by pulling the end of the sheet of plastic wrap. Also, there may not be a need to find the end of the sheet of plastic wrap when the sheet of plastic wrap is to be removed from the noodle strips. This can prevent a small piece of the sheet of plastic wrap from remaining on the surface of the noodle strip as a foreign substance. Thus, productivity in a noodle strip aging work can be improved.

According to a second feature of the present disclosure, winding the sheet of plastic wrap is performed such that one of the layers of the noodle strip, between which a folded portion of the sheet of plastic wrap is held, is a winding end portion of the noodle strip. Furthermore, the sheet of plastic wrap extends from the folded portion of the sheet of plastic wrap to an outside of the layers of the noodle strip.

Because of this configuration, the folded portion of the sheet of plastic wrap is held and double wound between the layers of winding end portion of the noodle strip. Because of this configuration, the sheet of plastic wrap can be firmly held to the surface of the noodle strip. Thus, the sheet of plastic wrap can be firmly wound around the noodle strip.

According to another feature of the present disclosure, a machine for aging a noodle strip comprises a noodle strip winding section that winds a noodle strip, which is elongated in a strip shape, around a noodle rod in a roll shape. The machine also includes a wrap winding section that winds a sheet of plastic wrap around the noodle strip such that an entirety of an outer peripheral of the noodle strip is covered by the sheet of plastic wrap. Additionally, the machine includes an aging section that preserves and ages a plurality of noodle strips arranged at a specified interval, each of the plurality of noodle strip being wound around the corresponding noodle rod in the roll shape and each being sequentially covered by the sheet of plastic wrap. Furthermore, the wrap winding section comprise a wrap holder that feedably holds the sheet of plastic wrap wound around a shaft of the wrap holder, the shaft of the wrap holder disposed parallel to the noodle rod. The wrap winding section also comprise a wrap insertion roller that presses the sheet of plastic wrap fed from the wrap holder and brings a pressed portion of the sheet of plastic wrap into contact with a surface of the noodle strip wound around the noodle rod in the roll shape. The wrap winding section also comprise a noodle rod rotation member that rotates the noodle rod around a shaft of the noodle rod in a state where the wrap insertion roller is away from the sheet of plastic wrap after the wrap insertion roller had been pressed to the sheet of plastic wrap. A contact portion of the sheet of plastic wrap pressed by the wrap insertion roller is folded such that a folded portion of the sheet of plastic wrap is long enough to be double wound in a winding direction of the noodle strip. The sheet of plastic wrap is held between layers of the noodle strip on an outer side of the noodle strip, the noodle strip having been wound around the noodle rod in the roll shape. The wrap winding section also comprise a noodle rod carrying-in means that moves the noodle rod by a specific distance. During this movement, noodle rod is in a state where the sheet of plastic wrap is wound around the outer peripheral of the noodle strip. The wrap winding section also comprise a wrap extension roller that feeds the sheet of plastic wrap from the wrap holder by a movement of the wrap extension roller.

Because of this configuration, beneficial effects similar to those of the first feature of the present disclosure can be obtained.

According to another feature of the present disclosure, the wrap insertion roller brings the pressed portion of the sheet of plastic wrap into contact with an inner surface of a winding end portion of the noodle strip, which has yet to be wound. Furthermore, the noodle rod rotation member closes the layers, including the winding end portion of the noodle strip, to hold the folded portion of the sheet of plastic wrap between the layers of the noodle strip.

Because of this configuration, beneficial effects similar to those of the second feature of the present disclosure can be obtained.

According to another feature of the present disclosure, the wrap extension roller includes an extension bar and a pulling-up roller. The extension bar is configured to be joined to and separated from the pulling-up roller in an up-down direction. Furthermore, the pulling-up roller is configured to rotate around an axis of the pulling-up roller extending in a width direction of the sheet of plastic wrap, such that the pulling-up roller contacts the surface of the sheet of plastic wrap and rotates in accordance with an up-down movement of the pulling-up roller. Furthermore, when the pulling-up roller is separated from the extension bar, the pulling-up roller is joined to and held by a fixing member, which is located below the sheet of plastic wrap.

Because of this configuration, in a situation where a space for the extension bar cannot be obtained on a side of the pulling-up roller, the extension bar can be configured to dispose above an upper surface of the feeding sheet of plastic wrap. In other words, when the pulling-up roller pulls up the sheet of plastic wrap to feed it, the extension bar is joined to the pulling-up roller, and after the feeding of the sheet of plastic warp has been completed, the pulling-up roller may again be separated from the extension bar.

According to another feature of the present disclosure, the noodle rod includes a pair of flanges and a winding portion between the pair of flanges. The noodle strip is configured to be wound around the winding portion. Furthermore, when the sheet of plastic wrap is fed from the wrap extension roller, the noodle rod is held by a holding member that contacts each of the flanges of the noodle rod from their outside. This is to prevent the noodle rod from moving in a direction in which the sheet of plastic wrap pulls the noodle rod.

Because of this configuration, the noodle rod is prevented from moving upward owing to the holding member. When the sheet of plastic wrap is pulled up by the pulling-up roller, the noodle rod receives a force in a moving direction of the pulling-up roller, via the sheet of plastic wrap. However, the noodle rod is prevented from moving upward owing to the holding member holding the noodle rod. Because of this configuration, the force becomes a feeding force to feed the sheet of plastic wrap. Thus, the sheet of plastic wrap can be fully fed according to the upward movement of the pulling-up roller.

According to another feature of the present disclosure, the aging section includes a conveying means in which the plurality of noodle strips positioned at the specified interval are preserved and aged during their conveyance. During the preserving and aging process, the plurality of noodle strips are covered by the sheet of plastic wrap. Furthermore, the noodle rod carrying-in means is arranged on a noodle strip carrying-in side of the conveying means. A noodle rod carrying-out means is arranged on a noodle strip carrying-out side of the conveying means. Furthermore, the conveying means includes a pair of chains by which the noodle rod is moved. The pair of chains are rotated via a plurality of sprocket wheels, and a plurality of blocks are arranged at a specified interval on outer plates of chain. Each block includes a recessed portion that receives a corresponding end portion of the noodle rod. An opening of the recessed portion of each block faces outside in a chain rotation direction. Furthermore, the conveying means, the noodle rod carrying-in means, and the noodle rod carrying-out means are configured such that when the noodle rod is moved to the aging section by the carrying-in means, the block is synchronously moved such that the recessed portion receives the corresponding end portion of the noodle rod. When the noodle rod is moved from the aging section by the conveying means, the block is synchronously moved such, that the noodle rod is pushed out of the recessed portion of the block to the noodle rod carrying-out means.

Because of this configuration, the blocks in the conveying means are formed on the outer plates of the chains and the recessed portion of each block is formed to face outside in the chain rotation direction. Because of this configuration, the recessed portion can receive the corresponding end of the noodle rod when the noodle rod is conveyed from the noodle rod carrying-in section to the aging section. Also, the noodle rod can be pushed out of the recessed portion and into the carrying-out section when the noodle rod reaches the carrying-out section.

According to another feature of the present disclosure, the machine further comprises a collection section to remove and collect the sheet of plastic wrap sequentially covering the plurality of noodle strips that were carried out from the aging section.

Because of this configuration, the sheet of plastic wrap can be consecutively collected by the collection section. This is because the sheet of plastic wrap extends sequentially between the plurality of noodle strips. Thus, workability for collecting the sheet of plastic wrap can be improved.

According to another feature of the present disclosure, the machine further comprises a noodle rod collection section to transfer the noodle rod, from which the noodle strip has been removed, back to the noodle strip winding section.

Because of this configuration, the empty noodle rod can be transferred back to the noodle strip winding section by the noodle rod collection section. Because of this configuration, a work for collecting the noodle rod and a work for returning the noodle rod to the noodle strip winding section can be eliminated.

DETAILED DESCRIPTION

The detailed description set forth below, when considered with the appended drawings, is intended to be a description of exemplary embodiments of the present disclosure and is not intended to be restrictive and/or to represent the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

A First Embodiment

Figure 1:
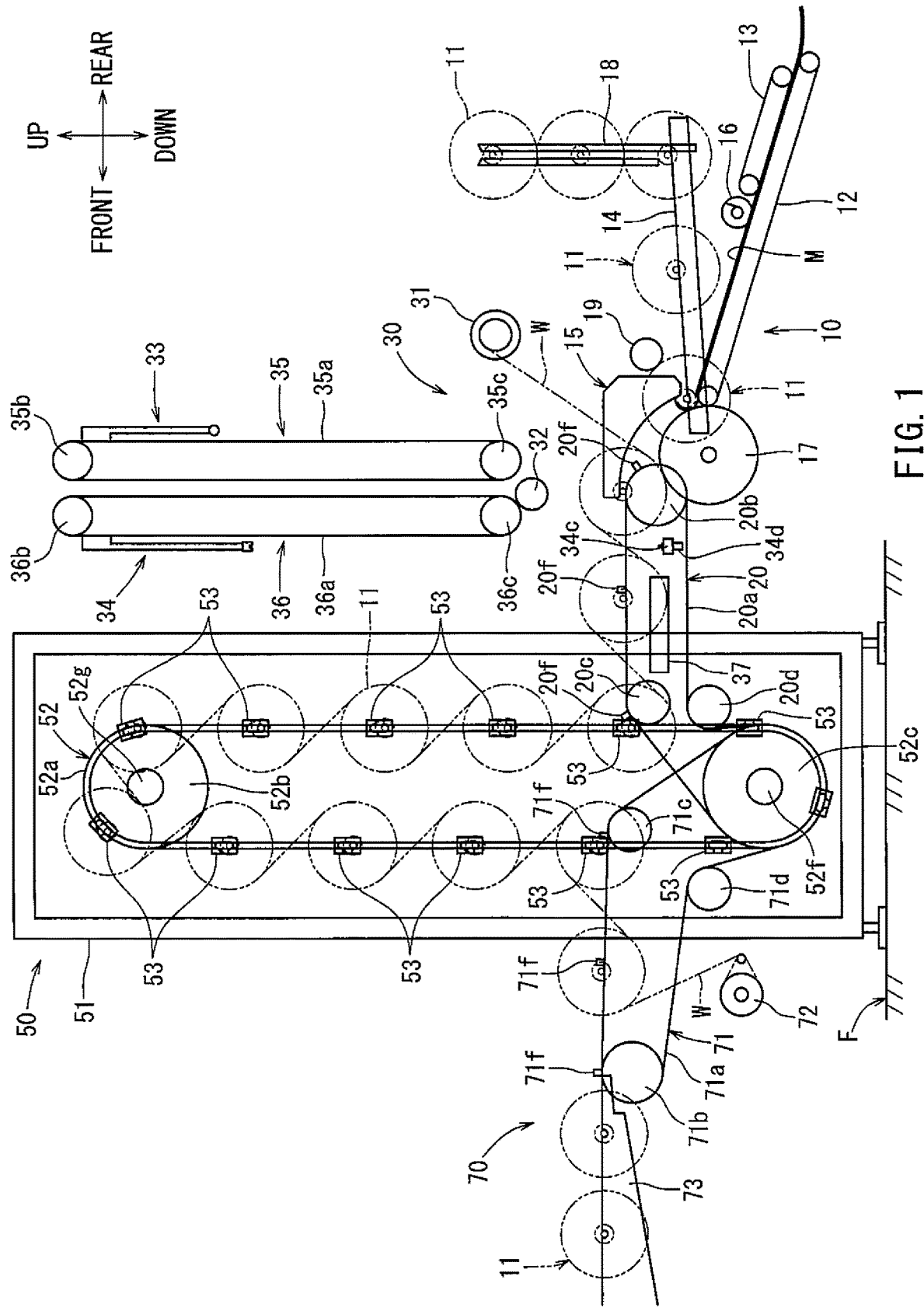
FIG. 1 is a side view of a machine for aging a noodle strip according to a first embodiment of the present disclosure.
Figure 2:
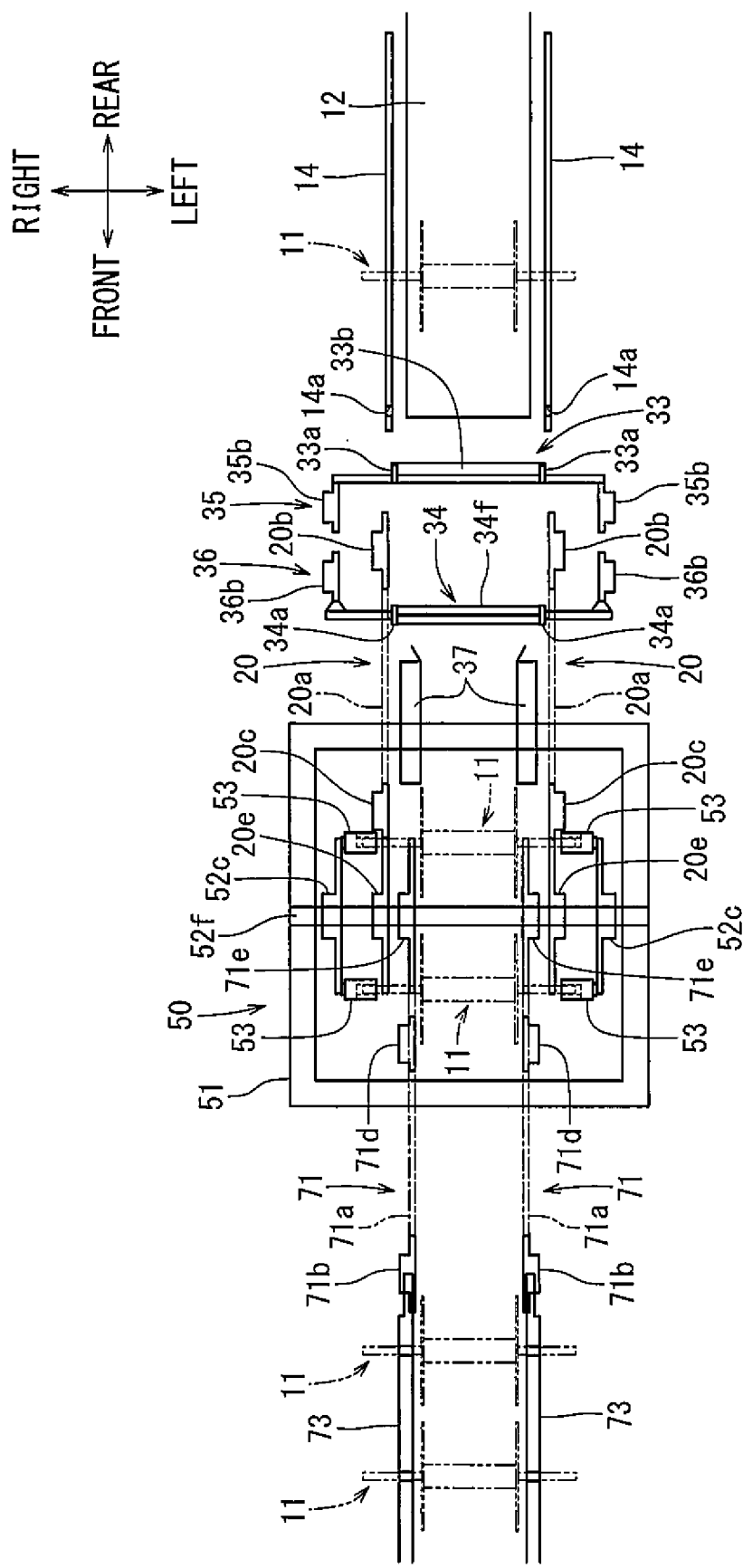
FIG. 2 is a plan view of the machine according to the first embodiment.

FIGS. 1 and 2 show a machine for aging a noodle strip according to a first embodiment of the present disclosure. In these figures, main parts of the machine for aging the noodle strip are schematically shown. In FIG. 1, the machine for aging the noodle strip is placed on a floor. The directions of up, down, front, and rear are shown with arrows in an upper right of this figure. The following description may be made based on the directions illustrated in each figure.

As shown in FIG. 1, an aging chamber 51, which includes an aging section 50 for aging a noodle strip M, may be placed on the floor F. A noodle strip winding section 10, which winds the noodle strip M on a noodle rod 11 in a roll shape, may be placed on a rear side of the aging section 50. A noodle strip extracting section 70, which extracts the noodle strip M wound around the noodle rod 11, may be placed on a front side of the aging section 50. A carrying-in section 20, which carries the noodle rod 11 wound with the noodle strip M into the aging section 50, may be placed between the aging section 50 and the noodle strip winding section 10. The carrying-in section 20 may be an embodiment of a noodle rod carrying-in means. The noodle strip extracting section 70 may include a carrying-out section 71, which carries the noodle rod 11 wound with the noodle strip M from the aging section 50. The carrying-out section 71 may be an embodiment of a noodle rod carrying-out means.

Figure 4:
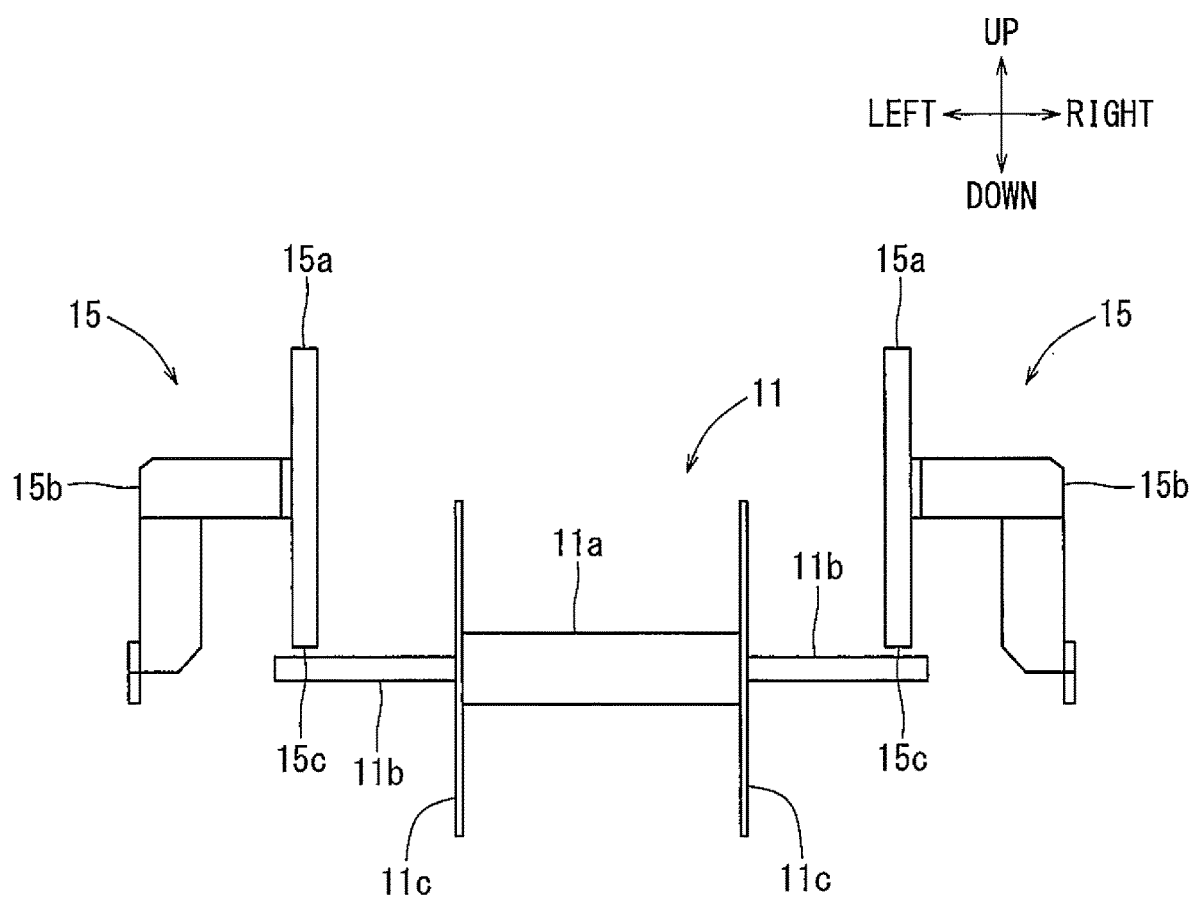
FIG. 4 is an enlarged front view of a noodle rod and a winding auxiliary guide according to the first embodiment.

As shown in FIG. 4, the noodle rod 11 may include a winding portion 11*a*, a pair of end portions 11*b*, and a pair of disk-shaped flanges 11*c*. Each end portion 11*b* may pass through a center of the corresponding flange 11*c*. The noodle strip M may be wound around the winding portion 11*a* in a roll shape. The noodle rod 11 may be supported and/or held by various members via the pair of end portions 11*b*, each serving as a supporting end.

As shown in FIG. 1, the noodle strip winding section 10 may include two conveyors 12, 13, a noodle rod carrying rail 14, a noodle rod rotation drum 17, and an auxiliary winding guide 15. The noodle strip M may be made by elongating a noodle dough into a strip shape to have a proper thickness and a uniform width in a preceding process. The noodle strip M may be carried to the conveyors 12, 13. The noodle rod 11, which is stored in a noodle rod feeding section 18, may be sent to the noodle rod carrying rail 14. The noodle rod rotation drum 17, which may be an embodiment of a noodle rod rotation member, may rotate the noodle rod 11 around an outer peripheral surface of the winding portion 11*a*. The noodle rod 11, which is being rotated by the noodle rod rotation drum 17, may be guided by the auxiliary winding guide 15 to move forward. In FIG. 2, the noodle rod rotation drum 17 and the auxiliary winding guide 15 are not shown.

Figure 3:
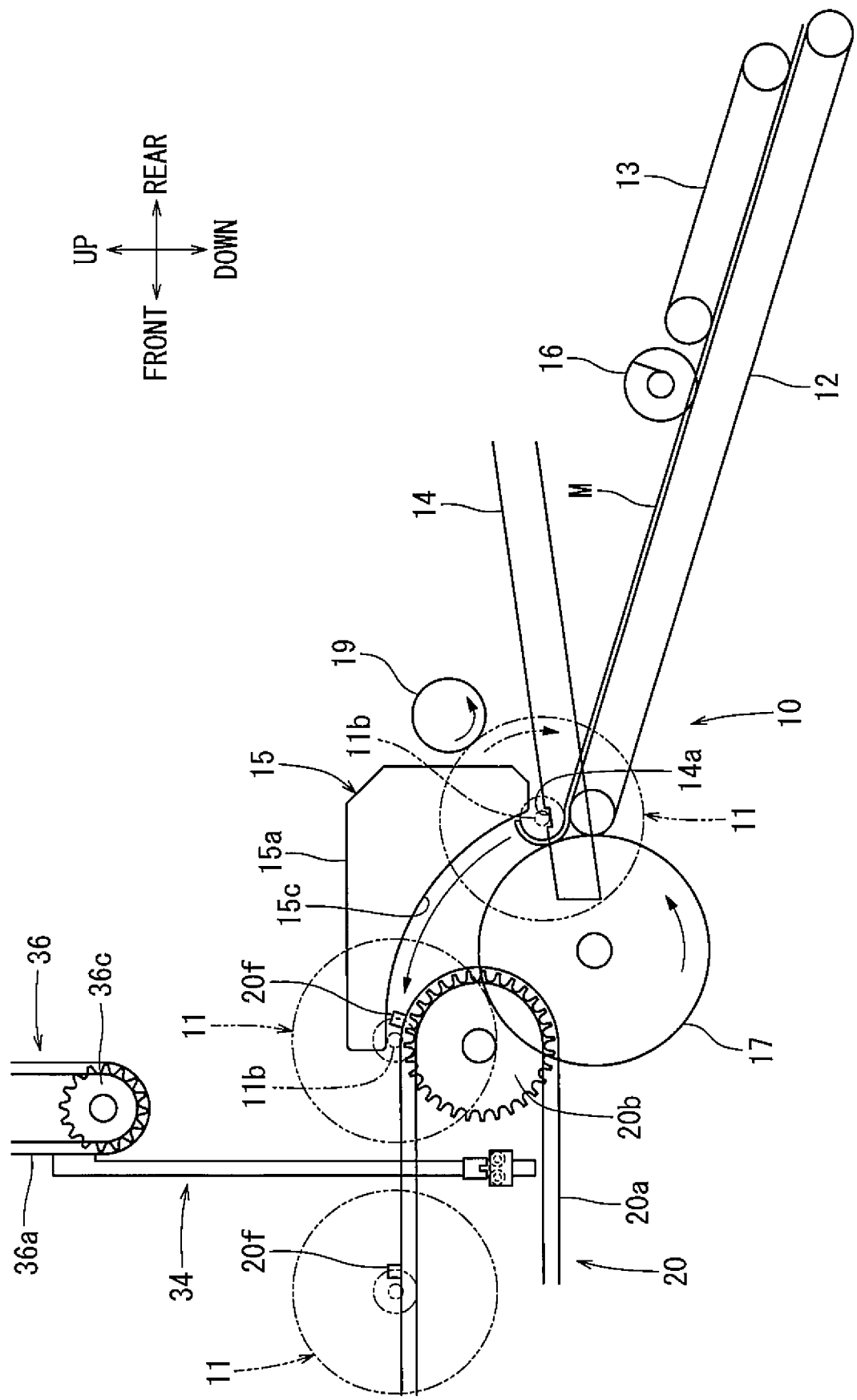
FIG. 3 is an enlarged view of a noodle strip winding section of the machine of FIG. 1.

The noodle strip M, which has a width of about 40 mm and a thickness of about 6-8 mm, may be carried between the conveyors 12, 13. The noodle strip M may be cut by a rotary cutter 16, which is placed above and on a front side of the conveyor 12, to have a specific length. As shown in FIGS. 1 and 2, a front end of the noodle rod carrying rail 14 may be intersected by a front end of the conveyor 12 in a left-right direction. In other words, the conveyor 12 may be disposed such that the front side is higher than the rear side. The noodle rod carrying rail 14 may be disposed such that the front side is lower than the rear side. As shown in FIG. 2, a pair of recess portions 14*a* may be formed on a front end of the noodle rod carrying rail 14, the front end of which intersects the conveyor 12. The end portions 11*b* of the noodle rod 11, the noodle rod 11 having rolled down along an upper surface of the noodle rod carrying rail 14 in a tilted manner as described above, may engage the recessed portions 14*a*. The noodle rod 11 may be rotatably supported at the recessed portions 14*a*. The winding portion 11*a* of the noodle rod 11 thus supported may contact an outer peripheral surface of the noodle rod rotation drum 17. As shown in FIG. 3, the noodle rod rotation drum 17 may be rotated by a motor (not shown) in a direction shown in FIG. 3. The noodle rod 11 may rotate by a friction force between the surfaces of the noodle rod 11 and the noodle rod rotation drum 17. Because of this configuration, as shown in FIG. 3, when the noodle strip M carried in by the conveyor 12 is positioned at the front end of the conveyor 12, a front end of the noodle strip M may be pressed by the outer peripheral surface of the noodle rod rotation drum 17 and wound around the winding portion 11a of the noodle rod 11. According to rigidity of the noodle strip M, the noodle strip M may sometimes fail to be wound around the winding portion 11a. In such a case, the winding drive roller 19 may be used such that the pair of flanges 11c of the noodle rod 11 may be rotated by the winding drive roller 19 to assist with winding the noodle strip M around the winding portion 11a. The winding drive roller 19 may be positioned such that a drum (not shown) of the winding drive roller 19 rotated by a motor (not shown) contacts an outer circumferential surface of the flanges 11c, thereby rotating the noodle rod 11. Further, it is sometimes preferable that an initial rotation speed of the noodle rod rotation drum 17 and/or the winding drive roller 19 is slower, in order to wind the front end of the noodle strip M around the winding portion 11a of the noodle rod 11.

As shown in FIGS. 3 and 4, a pair of auxiliary winding guides 15 may be positioned above the recessed portions 14a of the noodle rod carrying rail 14. Each of the pair of auxiliary winding guides 15 may include a guide plate 15a and a supporting frame 15b which supports the guide plate 15a. A lower end edge portion of the guide plate 15a may be a guide end portion 15c. The guide end portion 15c limits an upper position of the noodle rod 11. As shown by an arrow in FIG. 3, each end portion 11b of the noodle rod 11 may be guided by the guide end portion 15c to move rolling along the edge portion of the guide end portion 15c. In this period, the noodle strip M may be wound around the noodle rod 11. The noodle strip M may contact the surface of the noodle rod rotation drum 17, and thus the noodle rod 11 may be supported from below by the noodle rod rotation drum 17. As shown in FIG. 3, a space between the edge portion of the guide end portion 15c and the surface of the noodle rod rotation drum 17 may vary. This is because the radius of the noodle strip M wound around the noodle rod 11 may become larger as the noodle rod 11 rotates. The noodle strip M may be wound around the noodle rod 11 in this manner. This step may be an embodiment of a noodle strip winding step, which may be a part of a noodle strip aging method.

The carrying-in section 20 may be positioned below a front portion of the guide plate 15a. As shown in FIGS. 1 and 2, the carrying-in section 20 may include a pair of chains 20a which are rotated via sprocket wheels 20b, 20c, 20d, and 20e. The chain 20a may include engagement pieces 20f, which are formed on outer plates of the chain 20a that connect adjacent rollers, at a specified interval in an extending direction of the chain 20a. Each of the engagement pieces 20f may be formed outward of the chain 20a in a radial direction of the sprocket wheels 20b, 20c, 20d, and 20e. As shown in FIG. 3, when the noodle rod 11 reaches a front end portion of the guide plate 15a, the engagement piece 20f of the carrying-in section 20 may engage the end portion 11b of the noodle rod 11 to move the noodle rod 11 in a forward direction, i.e., toward the aging section 50.

As shown in FIG. 1, a wrap winding section 30 may be positioned above the noodle strip winding section 10 and the carrying-in section 20. The wrap winding section 30 may include a wrap insertion drive section 35 and a wrap extension drive section 36, which are disposed relative to each other in an front-rear direction. The wrap extension drive section 36 may be disposed in front of the wrap insertion drive section 35. The wrap insertion drive section 35 may be symmetrically positioned relative to the wrap extension drive section 36. In more detail, in the wrap insertion drive section 35, a chain 35a may be arranged between sprocket wheels 35b, 35c, which are disposed in an up-down direction. Similarly, in the wrap extension drive section 36, a chain 36a may be arranged between sprocket wheels 36b, 35c disposed in the up-down direction. Further, referring to FIGS. 1 and 2, a wrap insertion roller 33 may be supported by the chain 35a of the wrap insertion drive section 35, and a wrap extension roller 34 may be supported by the chain 36a of the wrap extension drive section 36. Thus, the wrap insertion roller 33 may be moved in the up-down direction as the chain 35a is rotated via the sprocket wheels 35b, 35c. The wrap extension roller 34 may be moved in the up-down direction as the chain 36a is rotated via the sprocket wheels 36b, 36c.

Figure 5:
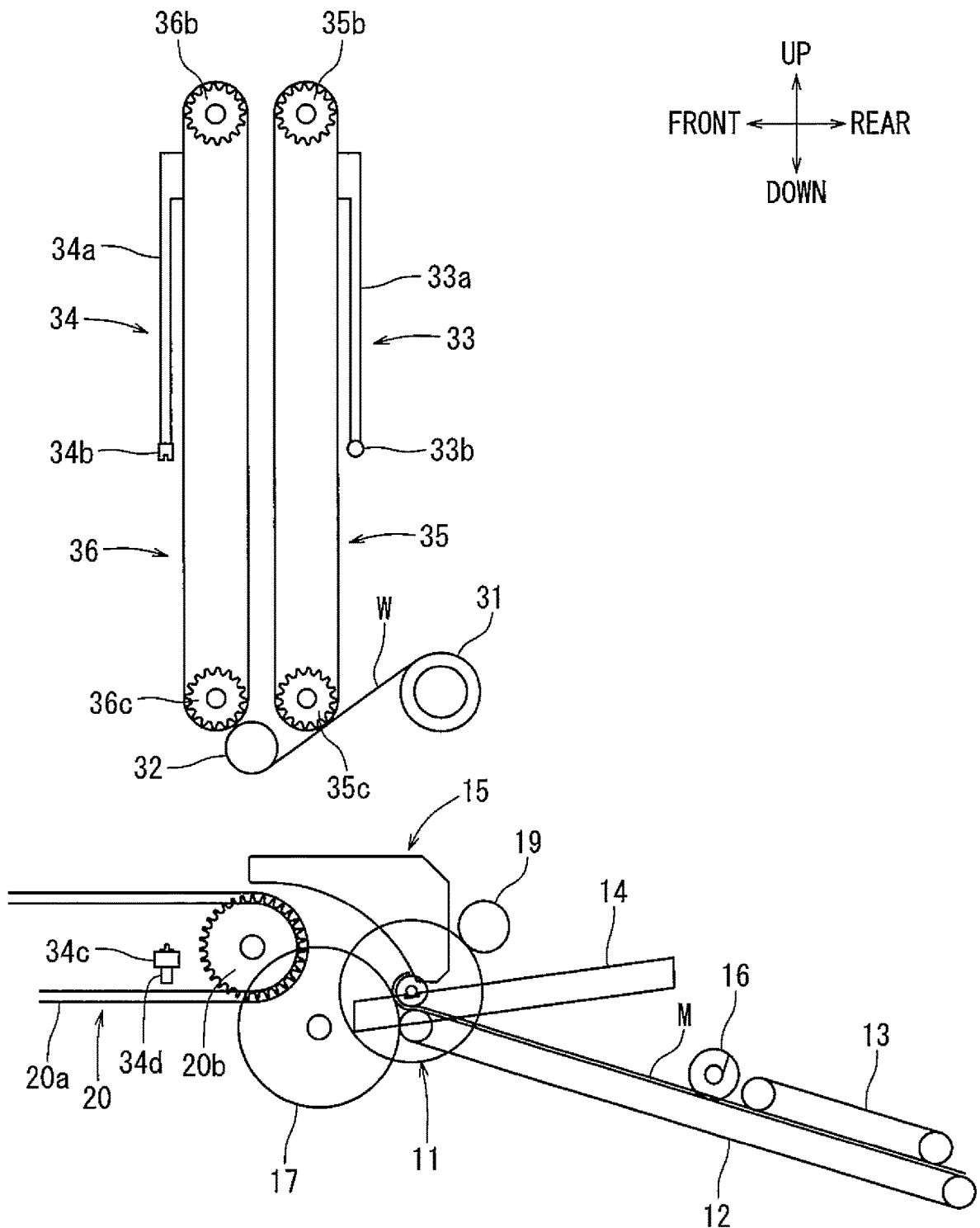
FIG. 5 is a schematic diagram according to the first embodiment, showing a state in which a sheet of plastic wrap is wound around an auxiliary roller.

Referring to FIGS. 2 and 5, the wrap insertion roller 33 may include a pair of insertion bars 33a extending in the up-down direction and a pressing roller 33b extending in the left-right direction. The pressing roller 33b is rotatably supported between lower ends of the insertion bars 33a. As discussed later, the pressing roller 33b may contact a surface of a sheet of plastic wrap to move the sheet of plastic wrap. After moving the sheet of plastic warp in this manner, it may be necessary to easily remove the pressing roller 33b from the surface of the sheet of plastic wrap. Because of this reason, a plurality of rings (not shown) may be disposed on an outer peripheral surface of the pressing roller 33b in an axial direction of the pressing roller 33b. A surface of each of the rings may be made of a material that makes it hard for a sheet of plastic wrap to adhere to the rings.

Figure 11:
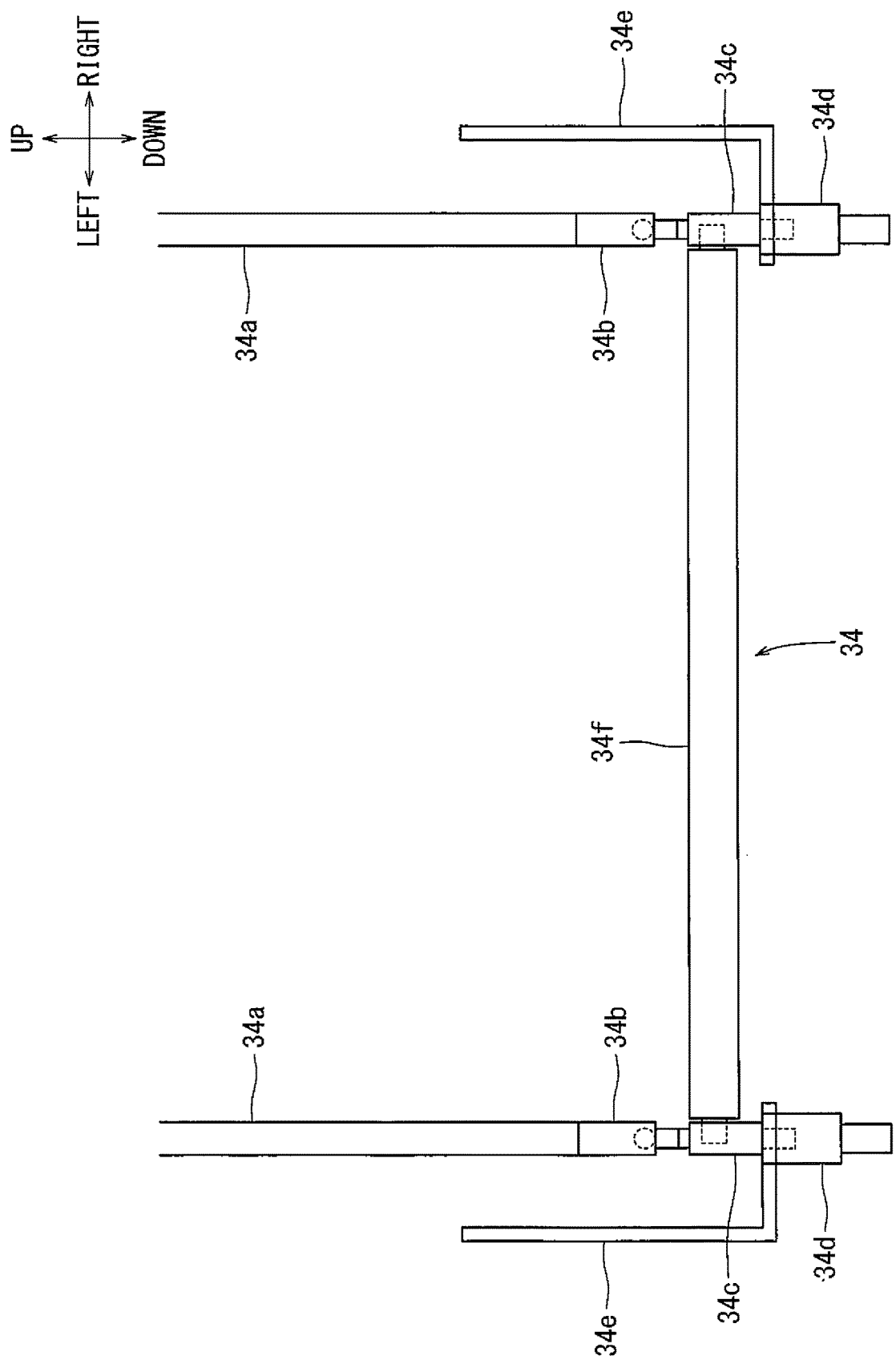
FIG. 11 is a front view of the extension bar, the pulling-up roller, etc. according to the first embodiment.

Referring to FIGS. 2 and 5, the wrap extension roller 34 may include a pair of extension bars 34a extending in the up-down direction and a pulling-up roller 34f extending in the left-right direction. The pulling-up roller 34f is rotatably supported between lower ends of the extension bars 34a. However, different from the insertion bars 33a and the pressing roller 33b, the extension bars 34a can be separated from the pulling-up roller 34f. Because of this ability, as shown in FIG. 11, each of the extension bar 34a may include a ball catch 34b on a bottom end of the extension bar 34a. Further, the pulling-up roller 34f may include a roller holder 34c at each end of the pulling-up roller 34f. As shown in FIG. 2, two pulling-up rollers 34 may be disposed relative to each other in the front-rear direction. The pulling-up rollers 34f may be rotatably arranged between the pair of roller holders 34c. The pair of roller holders 34c may be joined to and separated from the pair of ball catches 34b.

Referring to FIGS. 5 and 11, a pair of air dampers 34d may be arranged below the pair of roller holders 34c. The pair of air dampers 34d may serve as a fixing member to fix the roller holders 34c to the air clampers 34d. Referring to FIG. 11, each air damper 34d may be supported by a corresponding supporting frame 34e. The air clampers 34d may be positioned between the chains 20a of the carrying-in section 20. Further, the pair of air clampers 34d may be supported below a surface of the sheet of plastic wrap W, which will be discussed later. Each air damper 34d may be joined to the corresponding roller holder 34c when compressed air is supplied to the air clamper 34d from outside. In contrast, each air clamper 34d may be separated from the corresponding roller holder 34c when compressed air is not supplied to the air damper 34d. As shown in FIG. 2, the pair of the roller holders 34c may be disposed between the pair of chains 20a in the left-right direction, and thus the pulling-up roller 34f may be moved in the up-down direction between the inside and outside of an area surrounded by the pair of the chains 20a. Further, the pulling-up roller 34f may have a width larger than that of the sheet of plastic wrap in the left-right direction. This allows the pulling-up roller 34*f* to pull up the sheet of plastic wrap, which will be discussed later.

Figure 8:
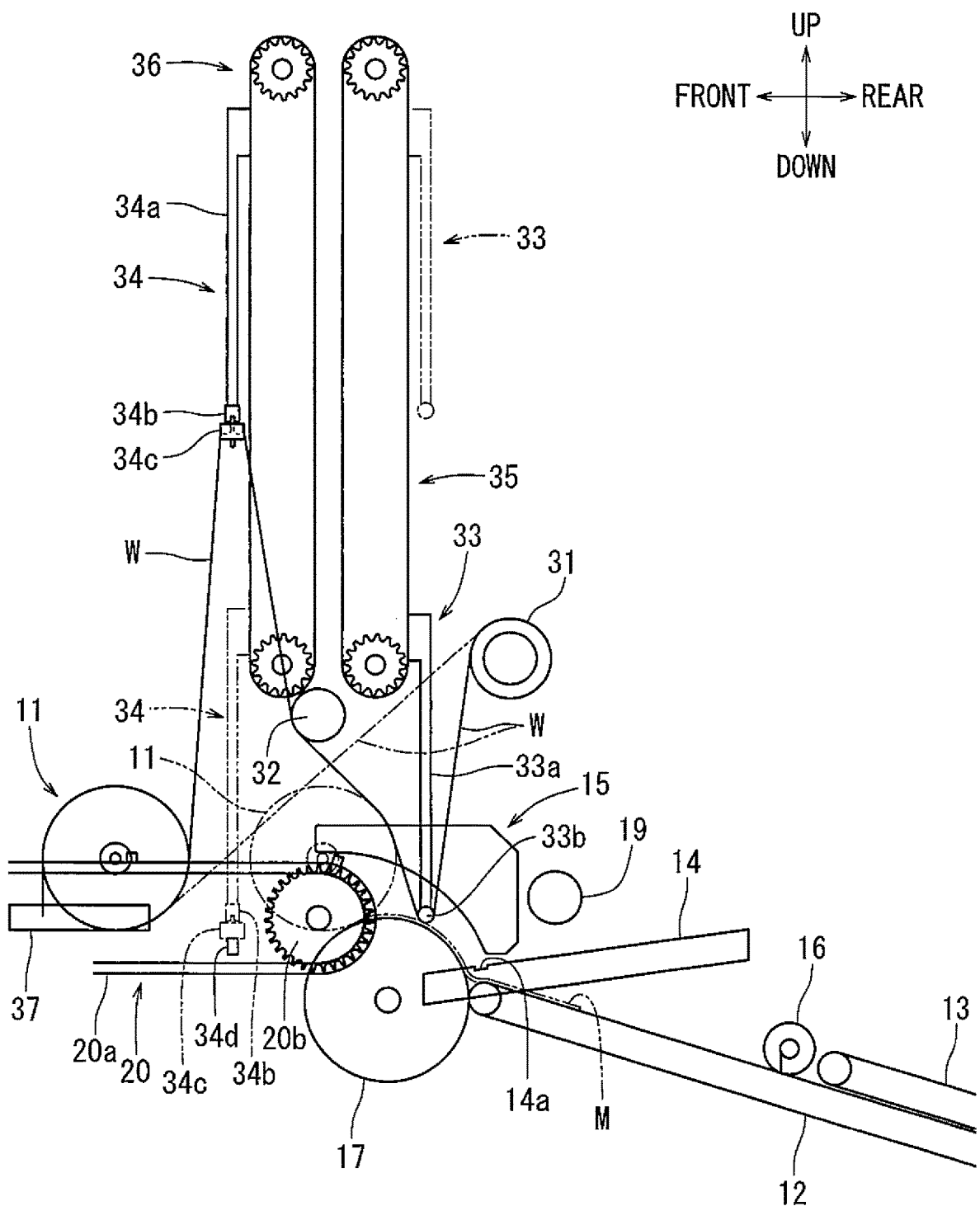
FIG. 8 is a schematic diagram according to the first embodiment, showing a state in which a wrap extension roller feeds the sheet of plastic wrap from a wrap holder and the wrap insertion roller presses the sheet of plastic wrap to the noodle strip.
Figure 9:
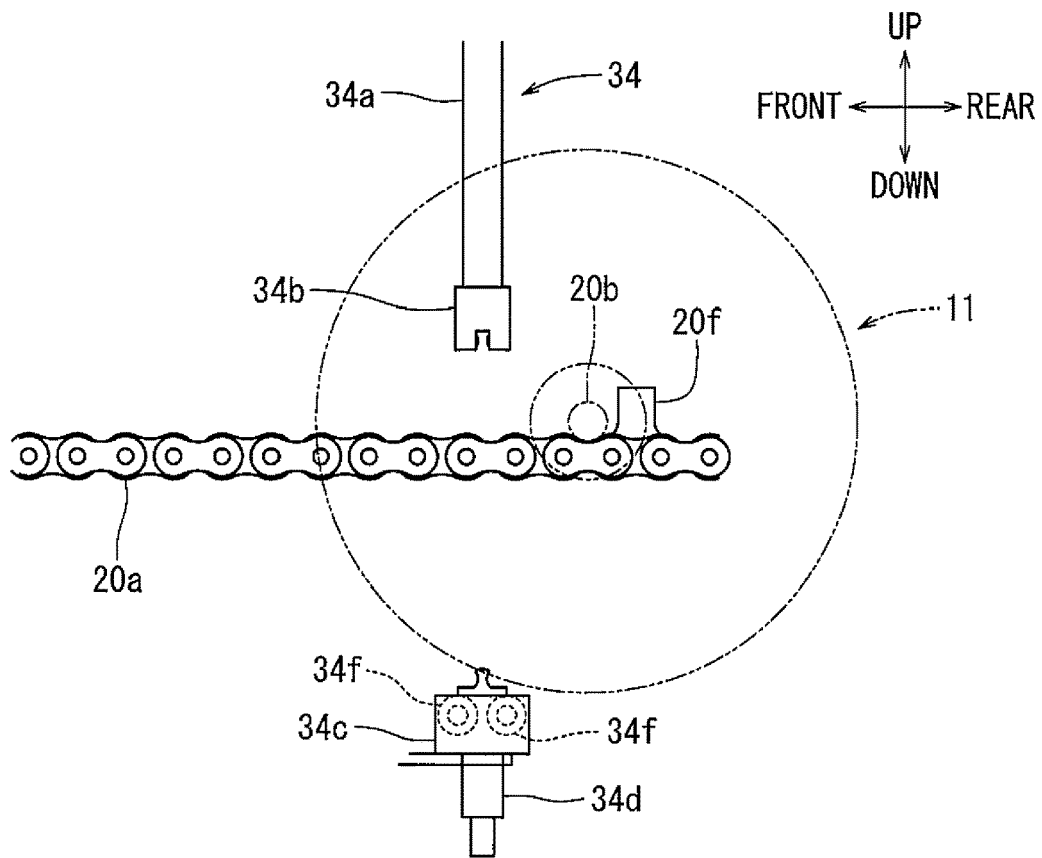
FIG. 9 is a schematic diagram according to the first embodiment, showing a state in which an extension bar is separated from a pulling up roller.
Figure 10:
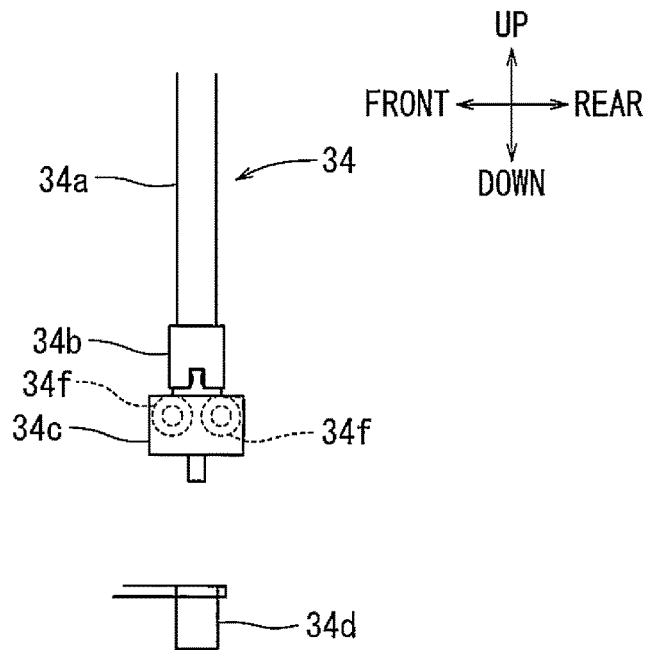
FIG. 10 is a schematic diagram according to the first embodiment, showing a state in which the extension bar is joined to the pulling up roller.

As shown in FIG. 9, when the roller holders 34*c* are joined by the air dampers 34*d*, the extension bar 34*a* may be moved upward while the roller holders 34*c* remain to be disposed at a position surrounded by the chains 20*a*. In this case, compressed air may be supplied to the air dampers 34*d*, such that each roller holder 34*c* is joined to the corresponding air damper 34*d*. In contrast, when the roller holders 34*c* are to be joined to the extension bar 34*a*, the extension bar 34*a* may be moved downward and then each ball catch 34*b* may be joined to the corresponding roller holder 34*c*. Further, when the roller holders 34*c* are to be pulled up above the position surrounded by the chain 20*a*, as shown in FIGS. 8 and 10, the supply of compressed air to the air dampers 34*d* may be shut-off, so as to allow the roller holders 34*c* to separate from the air dampers 34*d*. Then, the roller holders 34*c*, which are held by the ball catches 34*b*, may be moved upward as the extension bars 34*a* are pulled up. In this way, the extension bars 34*a* can be joined to and separated from the pulling-up rollers 34*f* in the up-down direction. In relation to the sheet of plastic wrap W, when the sheet of plastic wrap W is pulled up by the extension bars 34*a*, the sheet of plastic wrap W may be positioned between the ball catches 34*b* of the extension bars 34*a* and between the roller holders 34*c*.

As shown in FIG. 1, a wrap holder 31 may be positioned behind the sprocket wheel 35*c* of the wrap insertion drive section 35. The rotational axis of the wrap holder 31 may be parallel to that of the noodle rod 11. The sheet of plastic wrap W, the width of which is larger than the width between the flanges 11*c* of the noodle rod 11, may be wound around the wrap holder 31. Further, an auxiliary roller 32 may be disposed in front of the wrap holder 31 and below the wrap insertion drive section 35 and the wrap extension drive section 36. The rotational axis of the auxiliary roller 32 may be parallel to that of the wrap holder 31. The sheet of plastic wrap W, which is held around the wrap holder 31, may be configured to be wound around the auxiliary roller 32 by a predetermined length.

FIG. 5 shows a state in which the sheet of plastic wrap W held around the wrap holder 31 has been manually wound around the auxiliary roller 32. A length of the sheet of plastic wrap W wound around the auxiliary roller 32 may be configured such that the sheet of plastic wrap W can be wound about two or three turns around an outer peripheral of the noodle strip M. At this time, the wrap insertion roller 33 may be disposed above the wrap holder 31. Also, the wrap extension rollers 34 may be disposed at a position where the extension bars 34*a* face the insertion bars 33*a*. The roller holders 34*c* remain disposed at a position surrounded by the chains 20*a*. Further, the noodle strip M may be wound around the noodle rod 11 by the noodle rod rotation drum 17.

Figure 6:
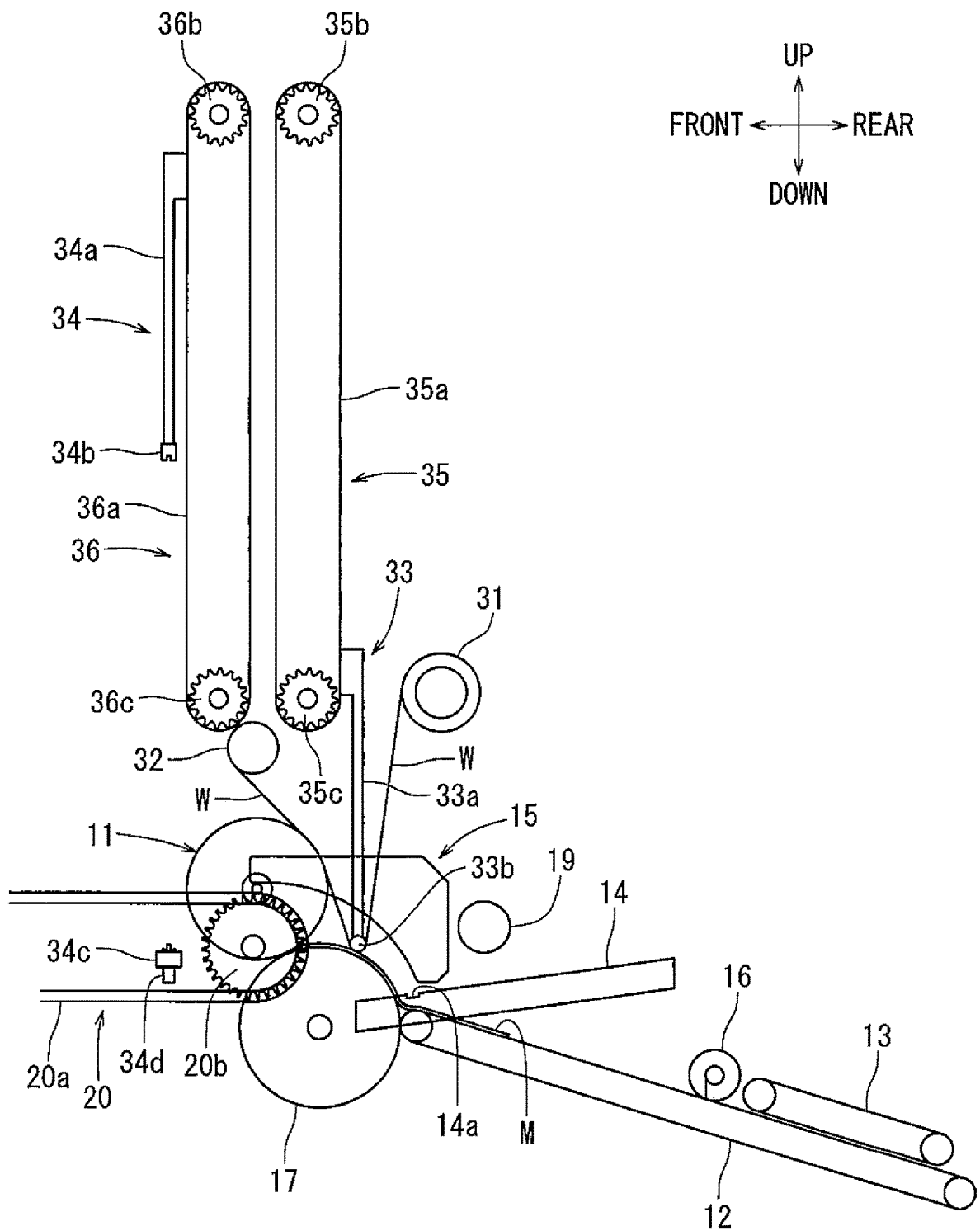
FIG. 6 is a schematic diagram according to the first embodiment, showing a state in which a wrap insertion roller presses the sheet of plastic wrap to the noodle strip.

FIG. 6 shows a state in which the pressing roller 33*b* of the wrap insertion roller 33 has been moved downward to press an upper surface of the portion of the sheet of plastic wrap W extending between the wrap holder 31 and the auxiliary roller 32. This portion of the sheet of plastic wrap W is pressed such that a lower surface of the sheet of plastic wrap W is pressed to a rear end portion of the noodle strip M, which is to be wound around the noodle rod 11. The noodle strip M may have been cut by a cutter 16, such that the noodle strip M can be wound a predetermined number of turns around the noodle rod 11 in a roll shape. The sheet of plastic wrap W may be pressed by the pressing roller 33*b* to a side of the noodle strip M corresponding to an inner side of the noodle strip M once it is wound around the noodle rod 11. The sheet of plastic wrap W is pressed near a last end portion of the noodle strip M cut by the cutter 16. After the last end of the noodle strip M has been wound around the noodle rod 11, i.e., the layers of the noodle strip M are completely closed, the sheet of plastic wrap W, which was pressed to the noodle strip M, may be folded and held between the layers of the noodle strip M in a state where the sheet of plastic wrap W is double wound while being adhered to the noodle strip M. At this time, the wrap insertion roller 33 may be moved upward far from the sheet of plastic wrap W. This prevents the pressing roller 33*b* from being caught between the layers of the noodle strip M.

Figure 7:
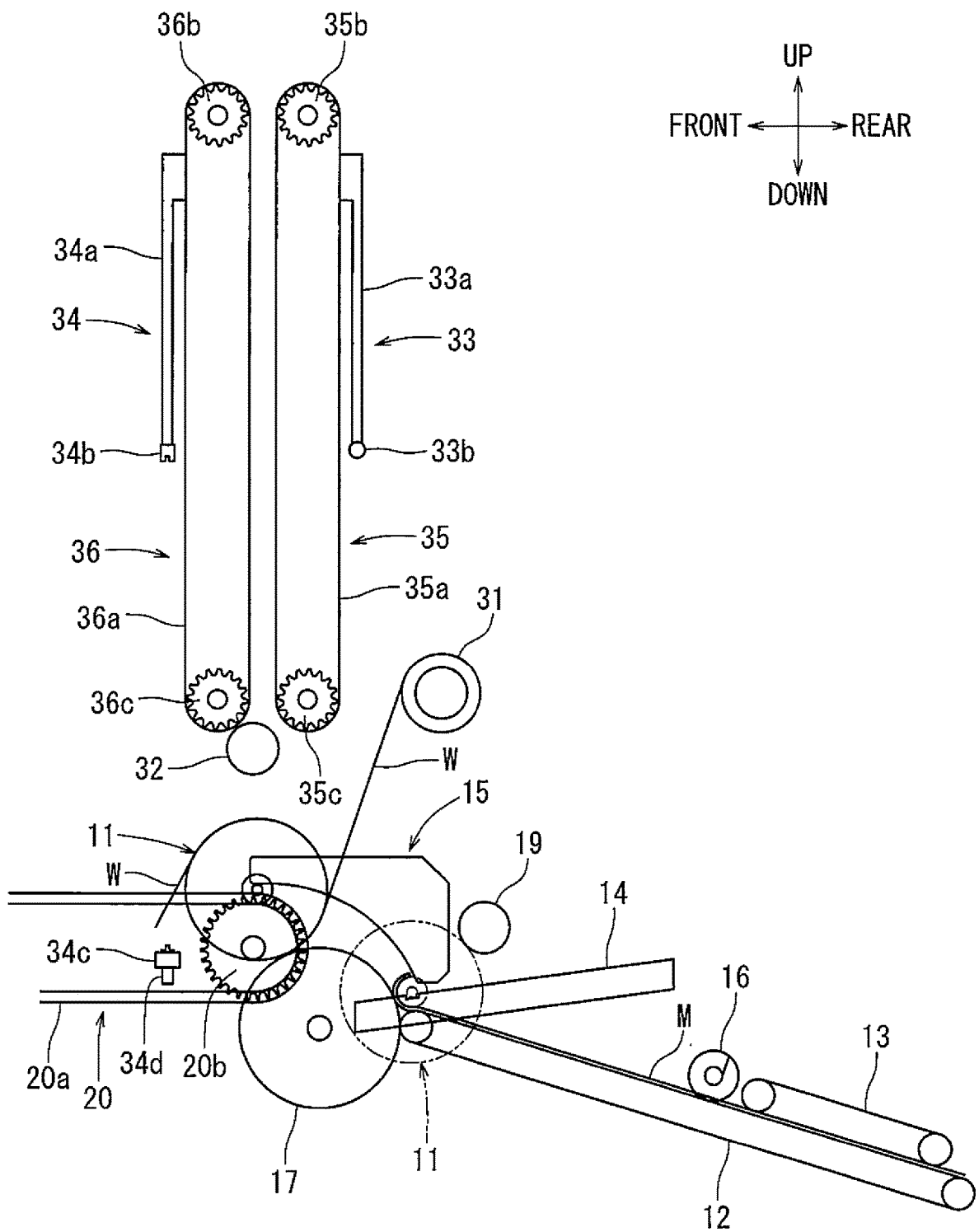
FIG. 7 is a schematic diagram according to the first embodiment, showing a state in which a winding of the sheet of plastic wrap around a noodle rod is finished.

FIG. 7 shows a state in which the sheet of plastic wrap W is double wound such that a folded portion of the sheet of plastic wrap W is wound between the final layers of the noodle strip M as described above. As described above, the sheet of plastic wrap W extending from the layers of the noodle strip M may have been wound to cover an entirety of the outer peripheral surface of the wound noodle strip M by rotation of the noodle rod 11. At this time, the sheet of plastic wrap W may be wound two or three turns around the noodle strip M. An end portion of the sheet of plastic wrap W, which has been released from the auxiliary roller 32, may be disposed outside of the outer peripheral of the noodle rod 11 without being wound around the noodle rod 11, as shown in FIG. 7. Because of this configuration, the end portion of the sheet of plastic wrap W can be easily accessed when the sheet of plastic wrap W is collected, which will be discussed later.

FIG. 8 shows a state in which the noodle rod 11, around which the sheet of plastic wrap W has been wound as discussed above, moves by a predetermined distance via the chains 20*a* of the carrying-in section 20. At this time, as shown by the two-dot-chain line representing the noodle rod 11 in FIG. 8, a next noodle rod 11 may be disposed at a front portion of the auxiliary winding guide 15, with the noodle strip M being wound around the next noodle rod 11. Further, similar to FIG. 6, the noodle strip M may not yet be completely wound around the next noodle rod 11, and an end portion of the noodle strip M may be left on the noodle rod rotation drum 17 and the conveyor 12. Then, as shown by the two-dot-chain line representing the wrap extension roller 34, the extension bars 34*a* of the wrap extension roller 34 may move downward to join the ball catches 34*b* to the roller holders 34*c*. Next, as shown by the solid line representing the wrap extension roller 34, when the extension bars 34*a* is to be moved upward, the air clampers 34*d* may be separated from the roller holders 34*c*. This allows the pulling-up rollers 34*f* and the extension bars 34*a* to be move upward. Because of this configuration, the pulling-up rollers 34*f* may pull up the sheet of plastic wrap W to pull more of the sheet of plastic wrap W from the wrap holder 31, as shown by the solid line in FIG. 8. Because the sheet of plastic wrap W is pulled up, the sheet of plastic wrap W may contact the auxiliary roller 32 and extend between the auxiliary roller 32 and the wrap holder 31.

At this time, as shown in FIG. 8, a pair of holding members 37 may contact respective outer sides of the flanges 11*c* of a former noodle rod 11. As a result, a position of the former noodle rod 11 may be held by a frictional force between the holding member 37 and the flanges 11*c*. In more detail, when the pulling-up rollers 34*f* pull up the sheet of plastic wrap W, the former noodle rod 11 may be prevented from being pulled up by the sheet of plastic wrap W. In other words, the former noodle rod 11 can be prevented from moving upward. Further, during a period when the noodle rod 11 is moved via the chains 20a of the carrying-in section 20, the flanges 11c of the noodle rod 11 may be moved in the front-rear direction while contacting the holding member 37. Thus, left and right end portions of the plastic wrap W, which are covering the surface of the noodle strip M, may be pressed and adhered to the corresponding left and right outer side of the flanges 11c.

Before the extension bars 34a move upward together with the roller holders 34c and the pulling-up roller 34f, the extension bars 34a may be separated from the roller holders 34c in the up-down direction. The reason is to avoid the extension bars 34a from contacting the noodle rod 11 as the noodle rod 11 moves in the front-rear direction via the chains 20a of the carrying-in section 20.

Next, the wrap insertion roller 33 may move downward, such that the pressing roller 33b presses the sheet of plastic wrap W against a rear end portion of the noodle strip M, which has yet to be wound around the noodle rod 11, similar to that discussed earlier referring to FIG. 6. After that, the sheet of plastic wrap W is double wound such that the folded portion of the sheet of plastic wrap W is wound between layers of the noodle strip M. The sheet of plastic wrap W may be wound to cover an entirety of the outer peripheral surface of the noodle strip M by rotation of the noodle rod 11. During this procedure, as shown in FIG. 8, the wrap extension roller 34 disposed at a position shown by the solid line may gradually move downward toward the position shown by the two-dot-chain line in accordance with the sheet of plastic wrap W being wound around the noodle rod 11. Then, the roller holders 34c may be joined to the air clampers 34d, and the extension bars 34a together with the ball catches 34b may move upward again. Also, the wrap insertion roller 33 may return to the position shown by the two-dot-chain line in FIG. 8. The noodle rod 11 around which the sheet of plastic wrap W has most recently been wound in this manner may move by the predetermined distance via the chains 20a of the carrying-in section 20.

Figure 14:
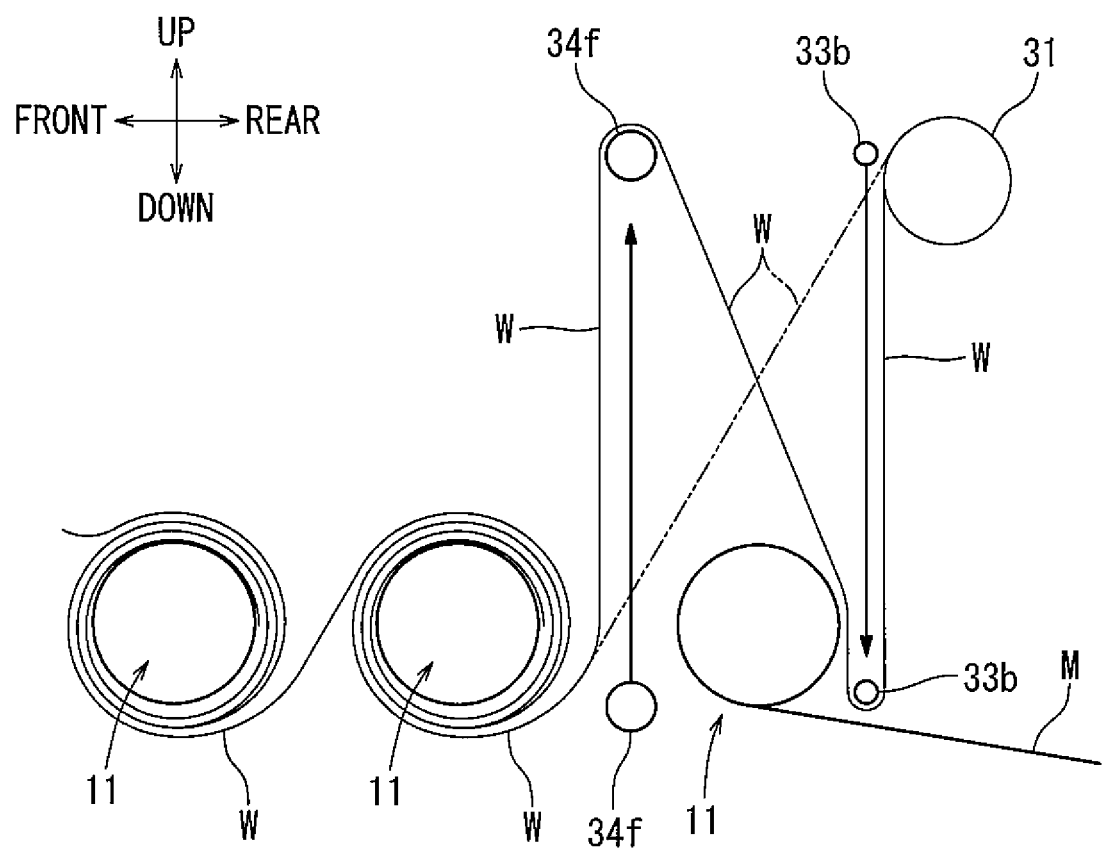
FIG. 14 is a schematic diagram according to the first embodiment, schematically showing a movement of a pressing roller and the pulling-up roller to wind the sheet of plastic wrap around the noodle strip.

FIG. 14 shows how a single sheet of plastic wrap W can be continuously wound around the surface of multiple noodle strips M, each noodle strip M being wound around separate noodle rods 11 in a roll shape, by repeating the above-mentioned procedure. The single sheet of plastic wrap W may be wound around the plurality of noodle strips M in this manner. This step may be an embodiment of a wrap winding step, which may be a part of a noodle strip aging method.

As shown in FIG. 1, the aging chamber 51 in the aging section 50 may include a circulation section 52 in which a series of noodle rods 11, around each of which the noodle strip M has been wound in a roll shape with the sheet of plastic wrap W covering the surface of the noodle strip M, are preserved and circulated. The circulation section 52 may be an embodiment of a conveying means. The circulation section 52 may include a pair of loop chains 52a which support the pair of end portions 11b of the noodle rod 11. A rotation shaft 52f may be rotatably arranged at a lower part of the aging chamber 51, and a pair of sprocket wheels 52c which rotate the chains 52a, may be connected to both ends of the rotation shaft 52f. Also, a rotation shaft 52g may be rotatably arranged at an upper part of the aging chamber 51, and a pair of sprocket wheels 52b which rotate the chains 52a may be connected to both ends of the rotation shaft 52g. In FIG. 2, the pair of sprocket wheels 52b and the rotation shaft 52g are omitted.

Figure 12:
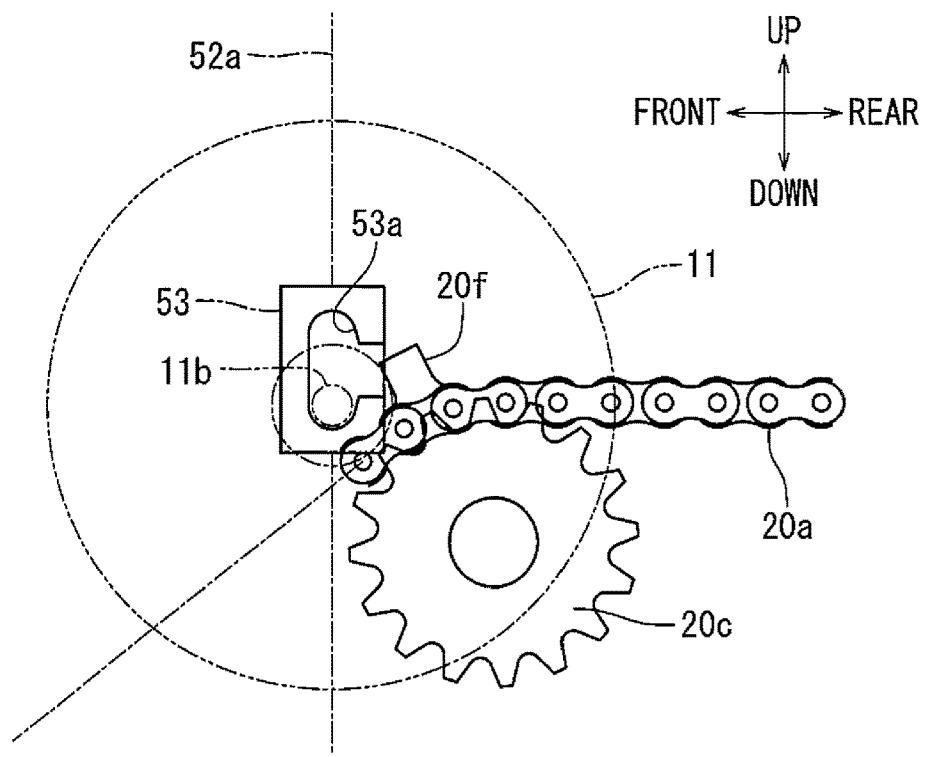
FIG. 12 is a schematic diagram according to the first embodiment, showing a state in which the noodle rod engages a block on a chain in an aging section.
Figure 13:
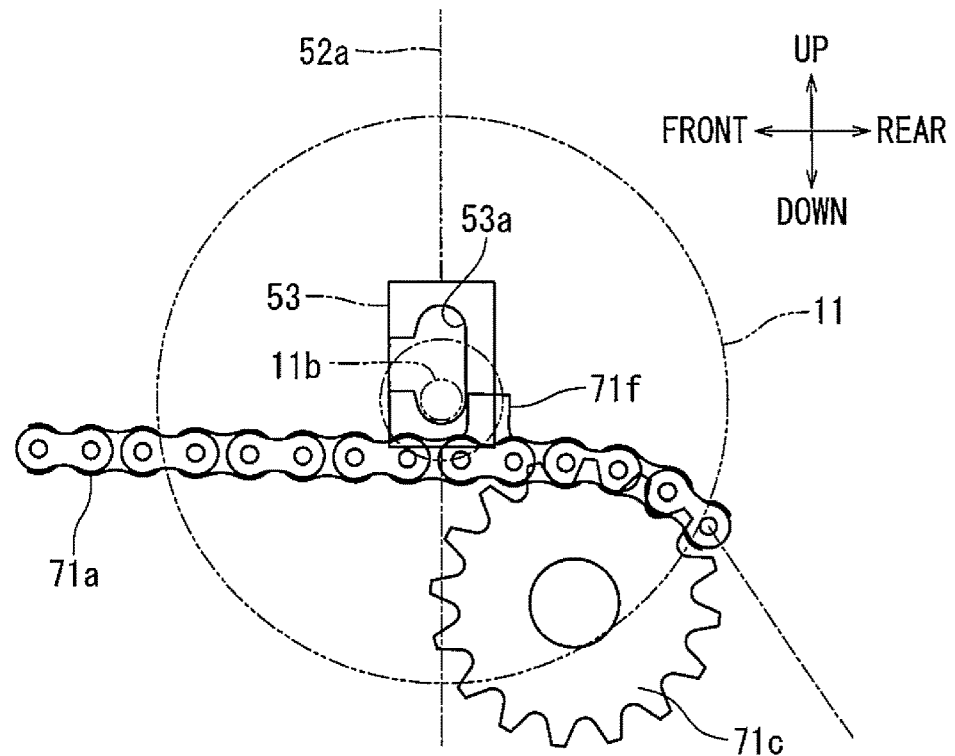
FIG. 13 is a schematic diagram according to the first embodiment, showing a state in which the noodle rod is pulled out from the block on the chain in the aging section.

As shown in FIG. 1, a plurality of blocks 53 may be provided at a specified interval along each of the pair of chains 52a. Each block 53 may be fixed to an outer plate that connects adjacent rollers of the chain 52. As shown in FIG. 2, a pair of block 53 may be arranged to face each other between the pair of chains 52a. Furthermore, as shown in FIGS. 12 and 13, a recessed portion 53a, which is configured to receive a corresponding end portion 11b of the noodle rod 11, may be formed in each block 53. Each recessed portion 53a may be arranged such that its opening faces an outer peripheral side of the rotating sprocket wheels 52b, 52c.

As shown in FIGS. 1 and 2, the noodle strip M being carried to the aging section 50 may be carried by the carrying-in section 20, which is located behind the aging chamber 51. The carrying-in section 20 may be an embodiment of a noodle rod carrying-in means. Also, the noodle strip M being carried out from the aging section 50 may be carried out by the carrying-out section 71, which is located in front of the aging chamber 51. The carrying-in section 20 may include a pair of chains 20a which are rotated via a plurality of sprocket wheels 20b, 20c, 20d, 20e. Similarly, the carrying-out section 71 may include a pair of chains 71a which are rotated via a plurality of sprocket wheels 70b, 70c, 70d, 70e. As shown in FIG. 2, the carrying-in section 20 may be nearly symmetrically arranged to the carrying-out section 71 with respect to the rotation shaft 52f of the aging section 50. Referring to FIG. 2, the carrying-in section 20, in the left-right direction, may be between the pair of sprocket wheels 52c of the aging section 50. Also, the carrying-out section 71, in the left-right direction, may be between the pair of sprocket wheels 20e of the carrying-in section 20. The width between the pair of chains 71a of the carrying-out section 71, as well as that of the pair of chains of the carrying-in section 20, may be configured to be large enough to receive the end portions 11b of the noodle rod 11. Similar to the chains 20a of the carrying-in section 20, each of the pair of chains 71a of the carrying-out section 71 may include engagement pieces 71f on outer plates of the chains 71a connecting adjacent rollers at a specified interval in an extending direction of the chains 71a.

Referring to FIG. 2, the sprocket wheels 52c that rotate the chains 52a in the aging section 50 may be synchronously driven by the same motor (not shown) that drives the sprocket wheels 20e that rotate the chains 20a of the carrying-in section 20, as well as that that drives the sprocket wheels 71e that rotate the chains 71a of the carrying-out section 71. Furthermore, as shown in FIG. 12, when the block 53 is moved to a position where the recessed portion 53a receives the end portion 11b of the noodle rod 11, the engagement piece 20f on the chain 20a of the carrying-in section 20 is moved to a position where the engagement piece 20f pushes the end portion 11b of the noodle rod 11 into the recessed portion 53a. Also, as shown in FIG. 13, when the block 53, the recessed portion 53e of which has received the end portion 11b of the noodle rod 11, moves to a position where the lower end of the block 53 is positioned near the chain 71a of the carrying-out section 71 such that the end portion 11b of the noodle rod 11 is just above the chain 71a, the engagement piece 71f on the chain 71a of the carrying-out section 71 is moved to a position where the engagement piece 71f pushes the end portion 11b of the noodle rod 11 out of the recessed portion 53a. Because of this configuration, the noodle rod 11, around which the noodle strip M has been wound in a roll shape, may be smoothly transferred from the chains 20a of the carrying-in section 20 to the blocks 53 of the aging section 50. Also, the noodle rod 11, around which the noodle strip M has been wound in a roll shape, may be smoothly transferred from the blocks 53 of the aging section 50 to the chains 71a of the carrying-out section 71. In addition to this, a distance between the noodle rods 11, which are being successively carried in, may be kept constant during the period in which the noodle rods 11 are transferred from the carrying-in section 20 to the aging section 50 and from the aging section 50 to the carrying-out section 71. Because of this configuration, the sheet of plastic wrap W that covers the surface of the noodle strip M, which has been wound around the noodle rod 11, may be held in a state in which the sheet of plastic wrap W is continuous between each of the noodle strip M. The noodle strip M wound around the noodle rod 11 may stay in the aging chamber 51 and the noodle strip M may be aged during its stay. This step may be an embodiment of a noodle strip aging step, which may be a part of a noodle strip aging method.

As shown in FIG. 1, a wrap collection roller 72, by which the sheet of plastic wrap W wound around the surface of the noodle strip M is removed and collected, may be arranged below the carrying-out section 71. At first, a feeding portion of the sheet of plastic wrap W may be manually wound around the wrap collection roller 72. Then, the wrap collection roller 72 may be synchronously rotated by the motor (not shown), which may also drive the sprocket wheels 71e of the carrying-out section 71, in order to collect the sheet of plastic wrap W. The sheet of plastic wrap W between adjacent wound noodle strips M may be continuous. Thus, the sheet of plastic wrap W can be sequentially collected from each of the noodle strips M. Because the sheet of plastic wrap W wound around the noodle strips M may be double wound, portions of the sheet of plastic wrap W may be collected in an overlapped manner.

A pair of noodle rod collection rails 73 may be arranged in front of the carrying-out section 71. The noodle rod collection rails 73 may be configured to receive the noodle rod 11 pushed out of the carrying-out section 71 by the chains 71a. The noodle strip M wound around the noodle rod 11 in a roll shape may be manually unwound and removed from the noodle rod 11. Then, an end portion of the noodle strip M may be connected to that of another noodle strip M. After that, the noodle strips M may be sent to a next procedure. The noodle rod 11, from which the noodle strip M has been removed, may be manually sent to the noodle rod feeding section 18 for reuse.

Beneficial Effects of the First Embodiment

As discussed above, in the noodle strip aging machine according to the first embodiment, the noodle strip M may be wound around the noodle rod 11 in a roll shape in the noodle strip winding section 10. The sheet of plastic wrap W may be wound around the noodle strip M during a period when the noodle strip M is being carried from the noodle strip winding section 10 to the carrying-in section 20. At this time, a single sheet of plastic wrap W may be continuously wound around a plurality of noodle strips M, without the need to cut the sheet of plastic wrap W between the noodle strips M. Because of this configuration, when the sheet of plastic wrap W is collected by the wrap collection roller 72 in the carrying-out section 71 after the noodle strips M have been aged in the aging section 50, it may not be necessary to manually find an end portion of the sheet of plastic wrap W because the end portion of the sheet of plastic wrap W has not been adhered to the surface of the noodle strip M. Thus, the sheet of plastic wrap W continuously wound around the noodle strip M can be collected in an efficient manner. Also, a small piece of the sheet of plastic wrap W may not remain on the surface of the noodle strip M, which will prevent the noodle strip M from containing a foreign substance.

A Second Embodiment

Figure 15:
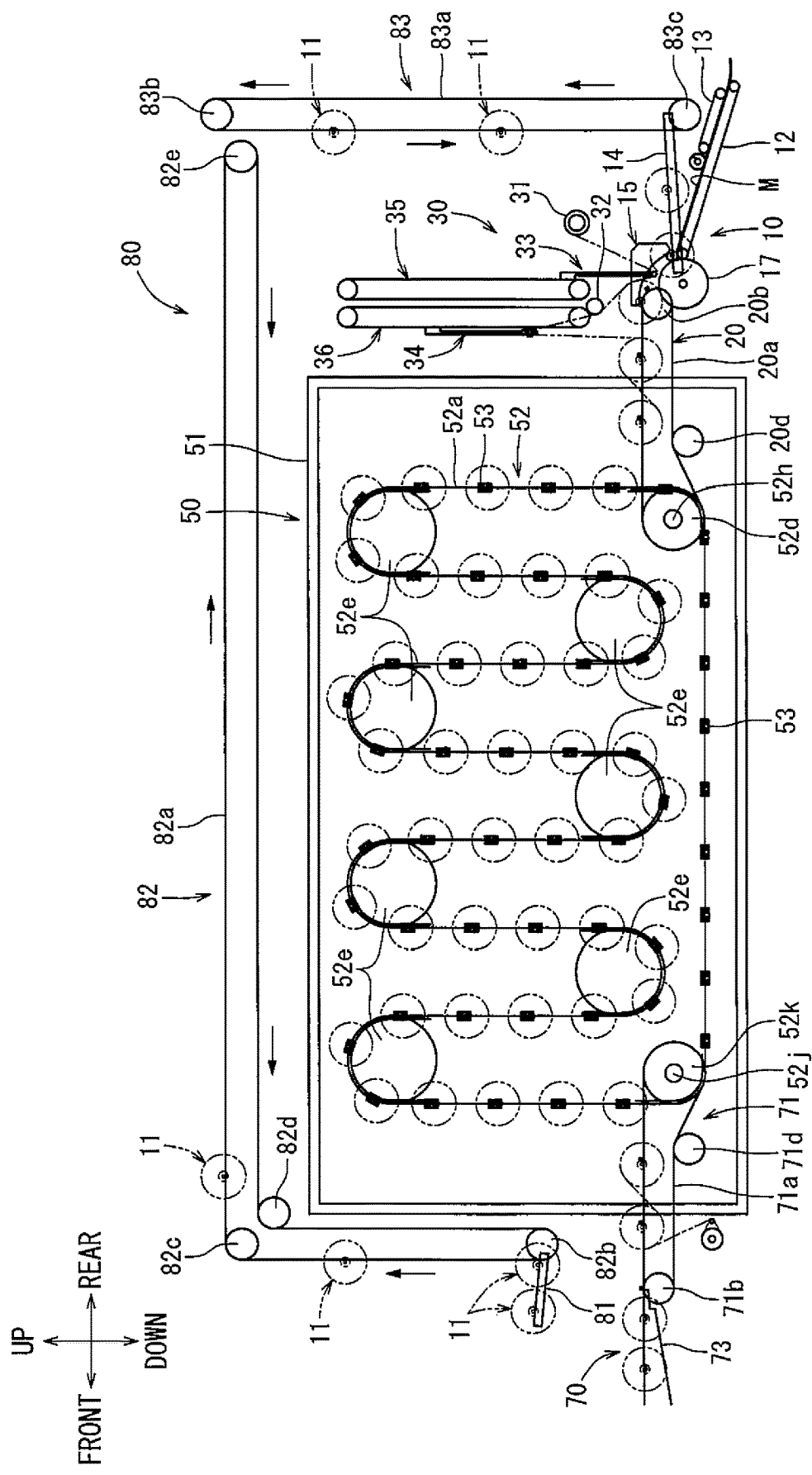
FIG. 15 is a side view of a machine for aging the noodle strip according to a second embodiment of the present disclosure.

FIG. 15 shows a second embodiment of the present disclosure. The second embodiment differs from the first embodiment in that a larger quantity of the noodle strip M may be aged in the aging section 50. Also, the noodle rod 11 collected in the noodle strip extracting section 70 may be automatically sent to the noodle strip winding section 10. Descriptions of the members and configurations in common with the first embodiment may be omitted by using the same reference numerals.

In the aging chamber 51 according to the second embodiment, the pair of chains 52a may be arranged in a zigzag manner in the front-rear direction, as shown in FIG. 15. The pair of chains 52a may rotate via a plurality of sprocket wheels 52e which are arranged in the up-down and left-right directions. Because of this configuration, each chain 52a of the second embodiment may have a longer length than in the first embodiment. Thus, in comparison to the first embodiment, more noodle rods 11 may be preserved and aged in the aging chamber 51 of the second embodiment.

Similar to the first embodiment, sprocket wheels 52d arranged nearer to the carrying-in section 20 may be rotated by a motor (not shown) such that these sprocket wheels 52d of the aging chamber 51 and the sprocket wheels 20e of the carrying-in section 20 are rotated by the same rotation shaft 52h. Further, sprocket wheels 52k arranged nearer to the carrying-out section 71 may be rotated by the motor (not shown) such that these sprocket wheels 52k of the aging chamber 51 and the sprocket wheels 71e of the carrying-out section 71 are rotated by the same rotation shaft 52j. The chains 52a of the aging section 50 may be rotated synchronously with the chains 20a of the carrying-in section 20 and the chains 71a of the carrying-out section 71.

A noodle rod collection section 80 may be arranged in front of, behind, and above the aging chamber 51. In the noodle rod collection section 80, used noodle rods 11 may be collected and sent to the noodle rod winding section 10. The noodle rod collection section 80 may include collection drive sections 82, 83. The first collection drive section 82 may include a pair of chains 82a and the second collection drive section 83 may include a pair of chains 83a. The pair of chains 82a of the first collection drive section 82 may be arranged in front of and above the aging chamber 51, and may be rotated via sprocket wheels 82b, 82c, 82d, 82e in a direction shown by arrows in FIG. 15. The pair of chains 83a of the second collection drive section 83 may be arranged behind the aging chamber 51 and may be rotated via sprocket wheels 83b, 83c in a direction shown by arrows in FIG. 15. Similar to the chains 20a of the carrying-in section 20 and the chains 71a of the carrying-out section 71, engagement pieces (not shown) may be formed in the chains 81a of the first collection drive section 83 and the chains of the second collection drive section 83a. Both of the end portions 11b of the noodle rod 11 may be engaged with corresponding engagement pieces such that the noodle rods 11 may be transferred by each set of chains 82a, 83a.

A noodle rod forwarding rail 81 may be arranged above the noodle rod collection rail 73 at a lower front portion of the first collection drive section 82. The noodle rod 11, from which the noodle strip M was removed while on the noodle rod collection rail 73, may be manually carried to and placed on the noodle rod forwarding rail 81. The noodle rod forwarding rail 81 may be fixed so as to be tilted in the font-rear direction as it extends from the front to the rear toward the chains 82a of the first collection drive section 82. Because of this configuration, the noodle rod 11 placed on the noodle rod forwarding rail 81 may roll down the slope of the noodle rod forwarding rail 81. Then, the end portions 11b of the noodle rod 11 may engage corresponding engagement pieces on the chains 82a of the first collection drive section 82 and may be moved via the chains 82a. The noodle rod 11 may be transferred from the first collection drive section 82 to the second collection drive section 83 via the engagement pieces on each corresponding chain 82a, 83a.

As shown in FIG. 15, a lower end of the chains 83a of the second collection drive section 83 may be arranged to intersect an upper portion of the noodle rod carrying rail 14. Because of this configuration, the noodle rod 11 engaged with the engagement piece (not shown) on the chains 83a of the second collection drive section 83 moved to the intersection position may be transferred from the second collection drive section 83 to the noodle rod carrying rail 14. The noodle rod 11 may then roll down the noodle rod carrying rail 14 and be supplied to the noodle strip winding section 10.

Beneficial Effect of the Second Embodiment

Similar to the first embodiment, the noodle strip M wound around the noodle rod 11 in a roll shape may be covered with the sheet of plastic wrap W. The noodle strip M may be aged in the aging chamber 51 during a period in which the noodle strip M is carried by the circulation section 52. The length of the circulation section 52 in the second embodiment may be longer than that of the first embodiment. Because of this configuration, a longer aging time for aging the noodle strip M may be obtained. Also, the noodle rod 11 carried out of the aging chamber 51 may be placed on the noodle rod forwarding rail 81 after the noodle strip M wound around the noodle rod 11 is removed. The noodle rod 11 may then be supplied to the noodle rod carrying rail 14 by the noodle rod collection section 80. Because of this configuration, the noodle rod 11 that is collected from the noodle rod collection rail 73 may need not be manually carried to the noodle rod carrying rail 14. Thus, a noodle rod collection work may be performed efficiently.

The above explanations are made about the first embodiment and the second embodiment. However, it is noted that the present teachings are not limited to the above-discussed embodiments, and it is understood that variations and modifications may be effected without limiting the disclosed configurations. In the above embodiments, the sheet of plastic wrap W may be wound around the noodle strip M such that the folded end portion of the sheet of plastic wrap W may be wound between the layers of the winding end portion of the noodle strip M. However, in a case where the sheet of plastic wrap W can be firmly adhered to the surface of the noodle strip M only by pressing the folded portion of the sheet of plastic wrap W to an outer surface of the noodle strip M using the pressing roller 33b, there may not be the need to wind the folded portion of the sheet of plastic wrap W between the layers of the noodle strip M. Instead, the sheet of plastic warp W may be double wound solely on the outer surface of the noodle strip M, i.e., an outermost layer of the noodle strip M.

In the above embodiments, the noodle rod 11 may include the pair of flanges 11c. However, the noodle rod 11 may not have the flanges 11c. Furthermore, in the above embodiments, the ball catch 34b and the air damper 34d may be used in order to join/separate the extension bar 34a of the wrap extension roller 34 to/from the pulling-up roller 34f. However, instead of the ball catch 34b and the air damper 34d, a magnetic force or other connection/disconnection means may be utilized.

In the above embodiments, the noodle strip M may be conveyed to the carrying-in section 20 via the conveyors 12, 13, such that the noodle strip M is conveyed to the aging chamber 51. However, in a case where an aging of the noodle strip M is not required, the noodle strip M may be directly sent to the noodle strip extracting section 70 by use of a bypass conveyor, which is newly arranged without performing the above-described procedures.

What is claimed is:

1. A method for aging a noodle strip, comprising:
   winding a first noodle strip, which is elongated in a strip shape, around a first noodle rod in a roll shape;
   winding a sheet of plastic wrap around the first noodle strip such that an entirety of an outer peripheral of the first noodle strip is covered by the sheet of plastic wrap;
   winding a second noodle strip, which is elongated in a strip shape, around a second noodle rod in a roll shape;
   winding the sheet of plastic wrap around the second noodle strip such that an entirety of an outer peripheral of the second noodle strip is covered by the sheet of plastic wrap; and
   preserving and/or aging the first and second noodle strips, which are arranged at a specified interval, each of the noodle strips being sequentially covered by the sheet of plastic wrap, wherein:
   when each of the windings of the sheet of plastic wrap is performed, the sheet of plastic wrap is folded to be held between at least a portion of the last two layers of the corresponding noodle strip on the corresponding noodle rod, the folded held portion of the sheet of plastic wrap being long enough to be double wound in a winding direction of the noodle strip; and
   an outer peripheral side of the folded sheet of plastic wrap wound around the first noodle strip extends to the second noodle strip.

2. The method according to claim 1, wherein the outer peripheral side of the folded sheet of plastic wrap wound around the first noodle strip continuously extends to an inner peripheral side of the folded sheet of plastic wrap wound around the second noodle strip.

3. A machine for aging the first and second noodle strips according to the method of claim 1, the machine comprising:
   a noodle strip winding section that winds the first and second noodle strips;
   a wrap winding section that winds the sheet of plastic wrap around the noodle strip such that the entirety of the outer peripheral of the first and second noodle strips is covered by the sheet of plastic wrap; and
   an aging section that preserves and/or ages the first and second noodle strips arranged at the specified interval, each of the first and second noodle strips being sequentially covered by the sheet of plastic wrap;
   wherein the wrap winding section comprises:
      a wrap holder that feedably holds the sheet of plastic wrap wound around a shaft of the wrap holder, the shaft of the wrap holder disposed parallel to at least one of the first and second noodle rod;
      a wrap insertion roller that presses the sheet of plastic wrap fed from the wrap holder and brings a pressed portion of the sheet of plastic wrap into contact with a surface of the noodle strip being wound around the noodle rod in the roll shape;

a noodle rod rotation member that rotates the noodle rod around a corresponding shaft of the noodle rod in a state where the wrap insertion roller is away from the sheet of plastic wrap after the wrap insertion roller has pressed the sheet of plastic wrap, a contact portion of the sheet of plastic wrap pressed by the wrap insertion roller being folded such that the folded portion is double wound in the winding direction of the noodle strip, the sheet of plastic wrap being held between at least the portion of the last two layers of the noodle strip;

a noodle rod carrying-in means that moves the noodle rod by a specific distance, the noodle rod being in a state where the sheet of plastic wrap is wound around the outer peripheral of the noodle strip wound around the noodle rod; and a wrap extension roller that feeds the sheet of plastic wrap from the wrap holder by a movement of the wrap extension roller.

4. The machine according to claim 3, wherein:

the wrap insertion roller brings the pressed portion of the sheet of plastic wrap into contact with an inner surface of a winding end portion of the noodle strip being wound; and the noodle rod rotation member closes the last two layers, which include the winding end portion of the noodle strip, to hold the folded portion of the sheet of plastic wrap between at least the portion of the last two layers of the noodle strip.

5. The machine according to claim 3, wherein:

the wrap extension roller includes an extension bar and a pulling-up roller, the extension bar configured to be joined to and separated from the pulling-up roller in an up-down direction;

the pulling-up roller is configured to rotate around an axis of the pulling-up roller extending in a width direction of the sheet of plastic wrap such that the pulling-up roller contacts a surface of the sheet of plastic wrap and rotates in accordance with an up-down movement of the pulling-up roller; and when the pulling-up roller is separated from the extension bar, the pulling-up roller is joined to and held by a fixing member disposed below the sheet of plastic wrap.

6. The machine according to claim 3, wherein:

the noodle rod includes a pair of flanges and a winding portion between the pair of flanges, the noodle strip being wound around the winding portion; and when the sheet of plastic wrap is fed from the wrap extension roller, the noodle rod is held by a holding member that contacts each of the flanges of the noodle rod to prevent the noodle rod from moving in a direction in which the sheet of plastic wrap pulls the noodle rod.

7. The machine according to claim 3, wherein:

the aging section includes a conveying means in which the first and second noodle strips at the specified interval are preserved and/or aged while the first and second noodle strips are conveyed, the first and second noodle strips being covered by the sheet of plastic wrap;

the noodle rod carrying-in means is arranged on a noodle strip carrying-in side of the conveying means;

a noodle rod carrying-out means is arranged on a noodle strip carrying-out side of the conveying means;

the conveying means includes:

a pair of chains by which the noodle rod is moved, the pair of chains being rotated via a plurality of sprocket wheels; and a plurality of blocks arranged at a specified interval on each chain, each block including a recessed portion that receives a corresponding end portion of the noodle rod, an opening of the recessed portion of each block facing outside in a chain rotation direction; and the conveying means, the noodle rod carrying-in means, and the noodle rod carrying-out means are configured such that:

when the noodle rod is moved to the aging section by the carrying-in means, the block is synchronously moved such that the recessed portion receives the corresponding end portion of the noodle rod; and when the noodle rod is moved from the aging section by the conveying means, the block is synchronously moved such that the noodle rod is pushed out of the recessed portion of the block to the noodle rod carrying-out means.

8. The machine according to claim 3, further comprising a collection section to remove and collect the sheet of plastic wrap sequentially covering the first and second noodle strips that are carried out from the aging section.

9. The machine according to claim 3, further comprising a noodle rod collection section to return at least one of the first and second noodle rod, from which the corresponding noodle strip was removed, to the noodle strip winding section.

10. The machine according to claim 3, wherein the wrap extension roller feeds the sheet of plastic wrap at a greater speed than the movement of the noodle rod in the carrying-in means.

11. A method for aging a noodle strip, comprising:

winding a first noodle strip, which is elongated in a strip shape, around a first noodle rod in a roll shape;

winding a sheet of plastic wrap around the first noodle strip such that an entirety of an outer peripheral surface of the first noodle strip is covered by the sheet of plastic wrap;

winding a second noodle strip, which is elongated in a strip shape, around a second noodle rod in a roll shape; and winding the sheet of plastic wrap around the second noodle strip such that an entirety of an outer peripheral surface of the second noodle strip is covered by the sheet of plastic wrap, wherein:

the sheet of plastic wrap continuously extends from the first noodle rod to the second noodle rod.

12. The method according to claim 11, wherein the portion of the sheet of plastic wrap extending between the first and second noodle rod extends as a single layer and does not overlap another sheet of plastic wrap.

13. The method according to claim 11, wherein the sheet of plastic wrap is double wound around the first noodle strip.

14. The method according to claim 11, wherein:

the sheet of plastic wrap wound around the first noodle strip includes a fold; and the sheet of plastic wrap extends from the fold in two contacting layers.

15. The method according to claim 14, wherein the fold of the sheet of plastic wrap is positioned between two layers of the first noodle strip.

16. The method according to claim 14, wherein the two contacting layers of the sheet of plastic wrap are wound around the entirety of the outer peripheral surface of the first noodle strip.

17. The method according to claim 11, wherein the first noodle strip is wound with more layers of the sheet of plastic wrap than a number of times the first noodle strip has been wound.

18. The method according to claim 11, further comprising the step of unwinding the sheet of plastic wrap from the first noodle strip and from the second noodle strip as a continuous sheet of plastic wrap.

\* \* \* \* \*